United States Patent
Sethi et al.

(10) Patent No.: US 11,327,876 B2
(45) Date of Patent: May 10, 2022

(54) VERIFYING A SOFTWARE OR FIRMWARE UPDATE USING A CONTAINER BEFORE DEPLOYING TO A CLIENT

(71) Applicant: EMC IP Holding Company LLC, Hopkinton, MA (US)

(72) Inventors: Parminder Singh Sethi, Ludhiana (IN); Sharmad Shashir Naik, Bangalore (IN); Akshita Das, Vadodara (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/856,145

(22) Filed: Apr. 23, 2020

(65) Prior Publication Data

US 2021/0334195 A1    Oct. 28, 2021

(51) Int. Cl.
 *G06F 11/36* (2006.01)
 *G06F 8/65* (2018.01)
 *G06F 9/4401* (2018.01)
 *G06N 20/00* (2019.01)

(52) U.S. Cl.
 CPC ............ *G06F 11/3688* (2013.01); *G06F 8/65* (2013.01); *G06F 9/4406* (2013.01); *G06F 9/4411* (2013.01); *G06F 9/4418* (2013.01); *G06F 11/3692* (2013.01); *G06N 20/00* (2019.01)

(58) Field of Classification Search
 CPC .... G06F 8/65; G06F 11/3688; G06F 11/3692; G06F 9/4406; G06F 9/4411; G06F 9/4418; G06N 20/00
 See application file for complete search history.

(56) References Cited

U.S. PATENT DOCUMENTS

| | | | | |
|---|---|---|---|---|
| 9,916,233 | B1* | 3/2018 | Qureshi | G06F 9/45533 |
| 2015/0186151 | A1* | 7/2015 | Shen | G06F 9/4418 |
| | | | | 713/2 |
| 2015/0271014 | A1* | 9/2015 | Madama | H04L 41/0893 |
| | | | | 709/222 |
| 2015/0331734 | A1* | 11/2015 | Joshi | G06F 11/079 |
| | | | | 714/33 |
| 2019/0138431 | A1* | 5/2019 | Holbrook | G06F 8/65 |
| 2020/0183811 | A1* | 6/2020 | Krishnan | G06F 11/3676 |
| 2021/0064509 | A1* | 3/2021 | Franke | G06F 11/368 |

* cited by examiner

*Primary Examiner* — S. Sough
*Assistant Examiner* — Cheneca Smith
(74) *Attorney, Agent, or Firm* — Krishnendu Gupta; Deepika Bhayana; Dorothy Wu Chiang

(57) ABSTRACT

In some examples, a server receives configuration data from a device. The server receives a software or firmware update from a vendor and determines, based on the configuration data, that the update is installable on the device. The server creates and configures a container, based on the configuration data, to create a replica of the device. The server installs the update in the replica and performs multiple tests that generate logs. If the logs indicate that the update caused no issues, the server sends the update to the device. If the logs indicate that the update caused an issue, the server sends the update to the vendor. In response, the server receives, from the vendor, a modified update that addresses the issue, installs the modified update in the replica, performs the tests, determines that the modified update causes no issues, and sends the modified update to the device.

17 Claims, 8 Drawing Sheets

VERIFYING A SOFTWARE OR FIRMWARE UPDATE USING A CONTAINER BEFORE DEPLOYING TO A CLIENT

BACKGROUND OF THE INVENTION

Field of the Invention

This invention relates generally to verifying a vendor software update and more particularly to verifying the vendor software update by executing tests on a container that replicates a configuration of a client server and using machine learning to analyze the test results.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A client may acquire (e.g., purchase or lease) multiple devices (e.g., servers) from a particular manufacturer (e.g., Dell®), with at least some of the servers using different software components and/or hardware components. For example, a first device may use a particular version of a software component and a hardware component while a second device may use a different (e.g., older or newer) version of the software component and the hardware component. Due to the number of different combinations of software components and hardware components, the vendor may be unable to test all possible combinations.

The manufacturer of the devices may receive updates (e.g., operating system updates, application updates, driver updates, firmware updates, and the like) from the vendors. For example, a vendor that provides a software component (e.g., operating system, application, or the like) used by a server may provide a software update. As another example, a vendor that provides a hardware component (e.g., graphics processing unit (GPU), modem, hard drive, camera, or the like) may provide a driver update, firmware update, or the like. Because the vendor is unable to test all possible hardware and software combinations, when the update is sent to the client, the client has to take each device (e.g., server) having a unique combination of hardware and software offline, install the update, test the update to determine if it causes any undesirable issues, and bring the device back online after verifying that the update does not cause undesirable issues. Such a process may be expensive as taking a device, such as a server, offline for updating and testing may result in the device being unable to process transactions (e.g., that the device normally processes) for an extended period of time.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

As an example, a manufacturer's server may receive configuration data from a client device. For example, the configuration data may include: (i) an operating system version of an operating system that is installed on the client device, (ii) a software application version associated with each of one or more software applications that are installed on the client device, (iii) a driver version of each of one or more drivers that are installed on the client device, (iv) a basic input output system (BIOS) version of the client device, (v) a firmware version of each of one or more hardware components included in the client device, or any combination thereof. The server may receive a vendor update from a vendor. The vendor update may include at least one of: (i) an operating system update to an operating system that is installed on the client device, (ii) a software application update to a software application that is installed on the client device, (iii) a driver update to a driver that is installed on the client device, (iv) a BIOS update to a BIOS of the client device, a firmware update to a firmware of a hardware component of the client device, or any combination thereof. The server may determine, based on the configuration data associated with the client device, that the vendor update is applicable to (e.g., installable on) the client device. The server may create a container and configure the container, based on the configuration data associated with the client device, to replicate a configuration of the client device, thereby creating a replica container. The server may install the vendor update in the replica container and perform multiple tests to the replica container with the vendor update installed to generate a set of logs (e.g., installation logs, memory dumps, operating system logs, and the like). For example, the plurality of tests may include: performing a normal boot, performing a fast boot, performing a hibernate followed by a boot from hibernate, performing a set of file handling tests (e.g., creating a file, opening the file, writing to the file, reading from the file, deleting the file, or any combination thereof), determining a memory footprint (e.g., amount of memory being used) of at least one software application executing on the client device, or any combination thereof. The server may use machine learning to perform an analysis of the set of logs. The server may determine, based on the analysis, that the vendor update caused no issues and send the vendor update to the client device. The server may determine, using the machine learning algorithm, a test category associated with individual tests of the plurality of tests. The machine learning algorithm may determine, based on multiple sets of logs generated by performing the plurality of tests to multiple vendor updates, a frequency of failure of individual test categories. Based on the frequency of failure of the individual test categories, the machine learning may determine a particular order in which to perform the tests. The server may receive a second vendor update from the vendor, uninstall the vendor update from the replica container, install the second vendor update in the replica container, and perform the plurality of tests (e.g., in the particular order) to the replica container with the second vendor update installed to generate a second set of logs. The server may perform a second analysis of the second set of logs, determine, based on the second analysis, that the second vendor update caused at least one issue, and send the second vendor update and the second set of logs to the vendor. The server may receive a modified update from the vendor. For example, the vendor may modify the second vendor update based on the second set of logs to address the at least one issue. The server may uninstall the second vendor update from the replica container, install the modified update in the replica container, perform the plurality of tests to the replica container (e.g., in the particular order) with the modified update installed to generate a third set of logs, perform a third analysis of the third set of logs, determine, based on the third analysis, that the modified update causes no issues, and send the modified update to the client device.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
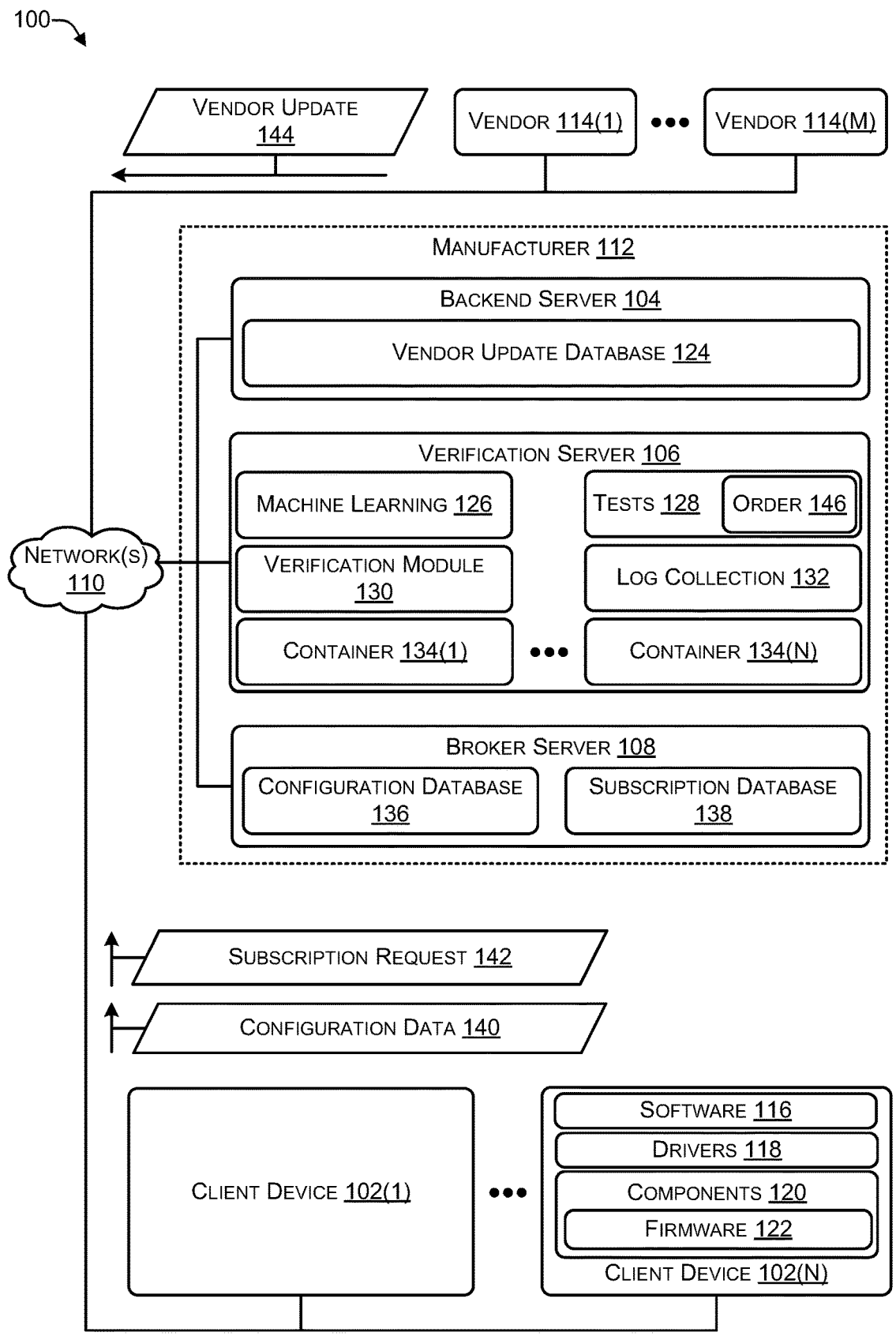
FIG. 1 is a block diagram of a system that includes client device to send configuration data and subscription requests to a manufacturer, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may receive an update (e.g., software or firmware) from a vendor, determine that a client device has subscribed to the update, create a container, configure the container based on the client device's configuration to replicate the client device, install the update in the container, perform tests on the container with the update installed, analyze the logs generated by performing the tests, and release the update to the client device after determining that the update may not cause issues (e.g., undesirable results) with the client device. If the logs indicate that issues may occur, the update may be sent, along with the logs, back to the vendor. The vendor may modify the update based on the logs and send a modified update. The modified update may be tested using the container with the replicated configuration and released to the client device if the logs indicate that the modified update may not cause issues.

The logs and tests used to generate the logs may be stored in a database and analyzed using machine learning to categorize each of the failure reasons. The machine learning may determine an order in which the tests are administered. For example, based on testing multiple client device configurations using containers, a first test may be performed before a second test because the first test has failed more often than the second test. Thus, the tests may be performed in an order that is based on a prediction by the machine learning that each test is likely to fail, with tests more likely to cause issues performed before tests that are less likely to cause issues.

Verifying the update using a container that replicates the configuration of the client device before sending the update to the client device provides several advantages as compared to sending the client device an untested and unverified update. First, the client may experience relatively few issues that cause downtime for the device after installing the update. Second, because the client does not have to take the device offline, install the update, and test the device, the device may be offline for a shorter period of time, thereby causing less disruption to the client's business. Third, the client may not perform as many tests, saving the client's information technology staff time and effort. Fourth, because fewer issues are caused as a result of installing the update, the customer's satisfaction with the manufacturer of the device may increase.

As an example, a computing device (e.g., a manufacturer's server) may include one or more processors and one or more non-transitory computer-readable media storing instructions that are executable by the one or more processors to perform various operations. For example, the operations may include receiving configuration data from a client device (e.g., a client server). The configuration data may include one or more of: (i) an operating system version or distribution (e.g., Windows® 7, Windows® 10, Red Hat® Linux®, Google® Chrome® 30.0, or the like) that is installed on the client device, (ii) a software application version (e.g., Adobe® Acrobat® X, or the like) that is installed on the client device, (iii) a driver version that is installed on the client device, (iv) a basic input output system (BIOS) version of the client device, (v) a firmware version of a hardware component (e.g., camera, disk drive, or the like) included in the client device, or any combination thereof. The operations may include receiving a vendor update from a vendor. The vendor update may include at least one of: (i) an operating system update to an operating system that is installed on the client device, (ii) a software application update to a software application that is installed on the client device, (iii) a driver update to a driver that is installed on the client device, (iv) a basic input output system (BIOS) update to a BIOS of the client device, a firmware update to a firmware of a hardware component of the client device, or any combination thereof. The operations may include determining, based on the configuration data associated with the client device, that the vendor update is applicable to (e.g., installable on) the client device. The operations may include creating a container and configuring the container, based on the configuration data associated with the client device, to replicate a configuration of the client device to create a replica container. The operations may include installing the vendor update in the replica container and performing a plurality of tests to the replica container with the vendor update installed to generate a set of logs (e.g., installation logs, memory dumps, operating system logs, and the like). For example, the plurality of tests may include: performing a normal boot, performing a fast boot, performing a hibernate followed by a boot from hibernate, performing a set of file handling tests (e.g., creating a file, opening the file, writing to the file, reading from the file, deleting the file, or any combination thereof), determining a memory footprint (e.g., amount of memory being used) of at least one software application executing on the client device, or any combination thereof. The operations may include performing an analysis of the set of logs. The operations may include determining, based on the analysis, that the vendor update caused no issues and sending the vendor update to the client device. The operations may include determining, by a machine learning algorithm, a test category associated with individual tests of the plurality of tests. The operations may include determining, by the machine learning algorithm and based on multiple sets of logs generated by performing the plurality of tests to multiple vendor updates, a frequency of failure of individual test categories. The operations may include determining, by the machine learning algorithm and based on the frequency of failure of the individual test categories, a particular order in which to perform the tests. The operations may include receiving a second vendor update from the vendor, uninstalling the vendor update from the replica container, installing the second vendor update in the replica container, and performing the plurality of tests (e.g., in the particular order) to the replica container with the second vendor update installed to generate a second set of logs. The operations may include performing a second analysis of the second set of logs. determining, based on the second analysis, that the second vendor update caused at least one issue, and sending the second vendor update and the second set of logs to the vendor. The operations may include receiving a modified update from the vendor. For example, the vendor may modify the second vendor update based on the second set of logs to address the at least one issue. The operations may include uninstalling the second vendor update from the replica container, installing the modified update in the replica container, performing the plurality of tests to the replica container with the modified update installed to generate a third set of logs, performing a third analysis of the third set of logs, determining, based on the third analysis, that the modified update causes no issues, and sending the modified update to the client device.

FIG. 1 is a block diagram of a system 100 that includes client device to send configuration data and subscription requests to a manufacturer, according to some embodiments. The system 100 may include multiple client devices 102(1) to 102(N) (N greater than zero) connected to one or more network(s) 110. Multiple servers, such as, a backend server 104, a verification server 106, and a broker server 108, associated with a manufacturer 112, may be connected to the network 110. While the manufacturer 112 is shown as having the servers 104, 106 and 108, the functionality illustrated may of course be organized on a single server or on multiple servers in a configuration different from what is illustrated in FIG. 1. Multiple vendors, such as vendors 114(1) to 114(M) (M greater than zero), may be connected to the network 110.

Each of the client devices 102 may include various hardware and software components. For example, the client device 102 (N) may include software 116, drivers 118, and hardware components 120. At least some of the hardware components 120 may include firmware 122. The software 116 may include an operating system and software applications. The firmware 122 may include a basic input output system (BIOS) of the client device 102(N), firmware of individual hardware components, such as, for example, a disk drive, a modem, a graphics card, a camera, or any combination thereof.

The backend server 104 may include a vendor update database 124 that includes updates associated with one or more of the software 116, the drivers 118 or the firmware 122 included in each of the client devices 102. For example, one of the vendors 114 may provide a vendor update 144 to the manufacturer 112. After receiving the vendor update 144, the manufacturer 112 may store the vendor update 144 in the vendor update database 124 on the backend server 104.

The verification server 106 may include various software modules to verify whether the vendor update 144 may cause issues when installed on a particular one of the client devices 102. The verification server 106 may include machine learning 126, multiple tests 128, a verification module 130, log collection 132, and containers 134(1) to 134(N). Each of the containers 134 may be standardized unit of software that packages software code and dependencies to enable an application to run as a self-contained unit that can be moved from one computing environment to another. For example, the containers 134 may use Docker® or another similar type of container. The containers 134 enable an application to be packaged with libraries and other dependencies to provide an isolated environment for running software. Instead of virtualizing the hardware stack as with virtual machines, the containers 134 virtualize at the operating system level, with multiple containers running directly on top of the operating system (OS) kernel. Thus, the containers 134 are lightweight (e.g., compared to virtual machines) because they share the OS kernel, start much faster, and use a fraction of the memory compared to booting an entire OS.

The broker server 108 may include a configuration database 136 and a subscription database 138. The configuration database 136 may include configuration data 140 received from individual ones of the client devices 102. The subscription database 138 may include subscriptions to updates based on a subscription request 142 received from individual ones of the client devices 102.

Subscription Phase

For example, the client device 102 (N) may send the configuration data 140 to the manufacturer 112. The manufacturer 112 may store the configuration data 140 in the configuration database 136. Thus, the configuration database 136 may include multiple configurations, with each configuration of the multiple configurations corresponding to a particular client device 102. Each of the client devices 102 may send a subscription request 142 to the manufacturer 112 requesting to subscribe to updates associated with one or more of the software 116, the drivers 118, or the firmware 122. The manufacturer 112 may store subscription information associated with each client device 102 in the subscription database 138, such as, for example, a unique identifier (e.g., a serial number, a service tag, or another unique identifier) associated with the client device 102, along with a link to the corresponding configuration data in the configuration database 136. For example, the configuration data may include information identifying the software 116, the drivers 118, and the firmware 122 associated with each of the client devices 102.

Verification Phase

The broker server 108 may periodically check with the backend server 104 to determine if a vendor update (e.g., the vendor update 144) has been received from one of the vendors 114. The broker server 108 may determine, based on the subscription database 138 and the configuration database 136, whether a particular client device 102 has subscribed to the vendor update (e.g., the configuration database 136 indicates that the particular client device 102 has a software or hardware component to which the vendor update applies). For example, the broker server 108 may determine that the vendor update 144 was received and stored in the vendor update database 124. The broker server 108 may instruct the verification server 106 to verify that the vendor update 144 may not cause issues when installed in a particular client device, such as the client device 102(N).

To verify the vendor update 144 for the client 102(N), the verification module 130 may create a container, such as the container 134(N), retrieve the configuration data 140 sent by the client device 102(N) and stored in the configuration database 136, and configure the container 134(N) based on the configuration data 140. Thus, the verification module 130 may replicate a configuration of one of the client devices 102 using one of the containers 134. The verification module 130 may install the vendor update 144 in the container 134(N) that is configured to replicate the client device 102(N) and perform the tests 128 in a particular order 146. The logs generated by performing the tests 128 may be stored in the log collection 132. For example, the logs may include operating system generated logs, software application generated logs, driver generated logs, and the like. To illustrate, the logs may be generated when an operating system, a software application, a driver, or a firmware of a component initiates execution, initiates stopping execution, encounters an unexpected condition, or the like. If the logs generated by performing the tests 128 indicate that the vendor update 144 cause one or more issues, then the logs may be sent to the vendor (e.g., of the vendors 114) that created the vendor update 144 to enable the vendor to modify the vendor update to address the issues.

The machine learning 126 may be used to analyze the logs produced as a result of performing the tests 128. For example, the machine learning 126 may determine a reason why a particular test failed (e.g., caused an issue) and categorize the reason. The machine learning may determine which categories cause the most failures and revised the order 146 accordingly. In this way, a test that (based on historical data) is likely to cause an issue may be performed before a test that is less likely to cause an issue. The verification phase is described further in FIG. 2.

Update Phase

If the logs generated by performing the tests 128 to the container 134(N) (e.g., configured to replicate the client device 102(N)) and in which the vendor update 144 is installed) indicate that the vendor update 144 did not cause any issues, then the vendor update 144 may be sent to the client device 102(N) for installation. After the vendor update 144 sent to the client device 102(N), the client may install the vendor update 144 on the client device 102(N). The update phase is described further in FIG. 3.

Thus, vendors that provide software or hardware components used in client devices may provide a vendor update to the software (e.g., operating system, applications, device drivers, or the like) or the firmware of hardware components that are included in the client devices. The manufacturer of the client devices may verify that installing the vendor update does not cause any issues. For example, a verification server may create a container and replicate a configuration of a client device based on configuration data sent by the client device. The verification server may install the vendor update in the replica container and perform various tests. The verification server may analyze the logs generated by performing the tests to determine if the update caused any issues. If no issues were caused during testing then the update may be released, e.g., sent or made available for download to the client device. If the verification server determines that, during testing, issues were caused by the update to the replica of the client device, then the verification server may analyze the logs and create a report. The report may include recommendations to the client to modify the configuration of the software and/or hardware of the client device to address the issues.

Figure 2:
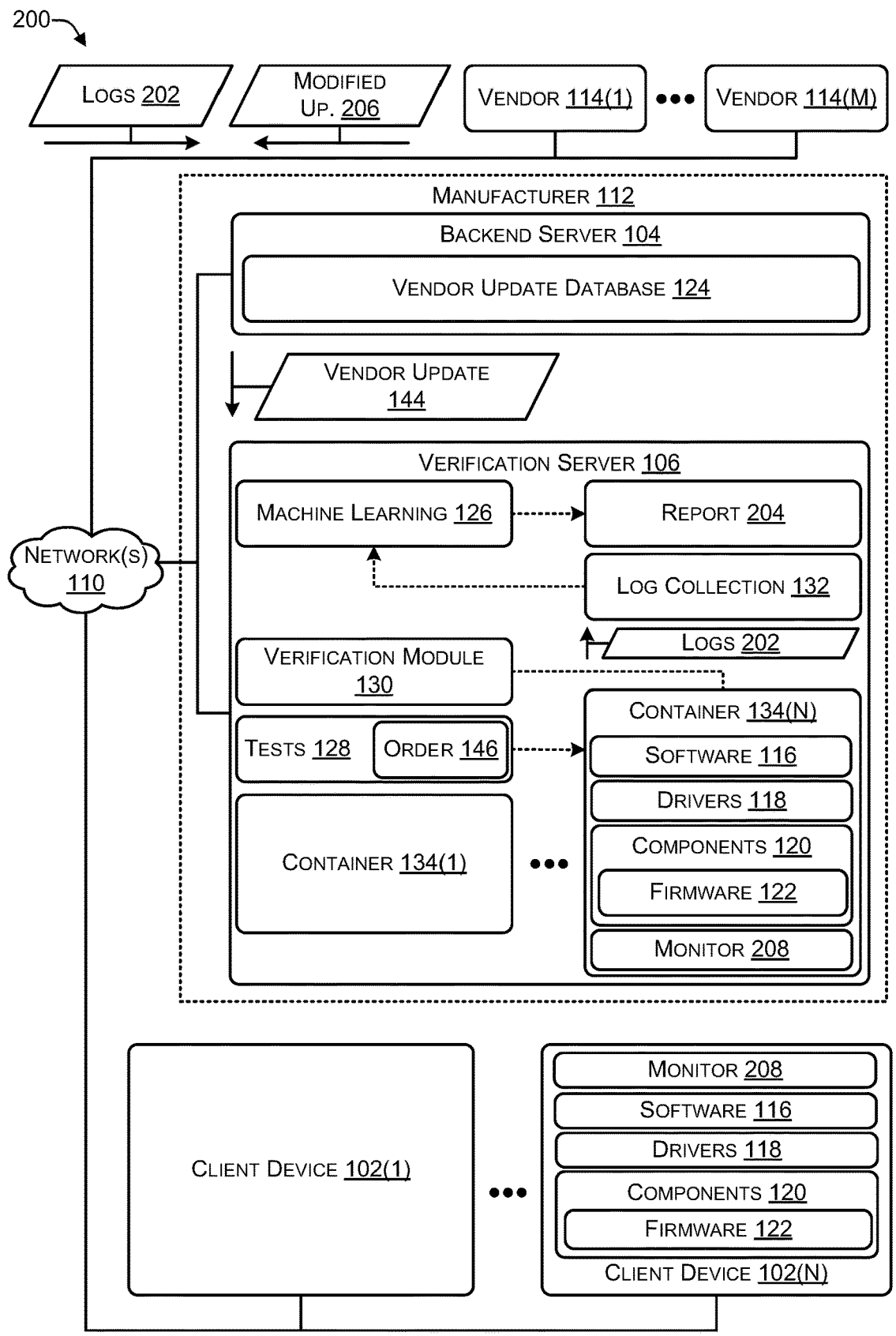
FIG. 2 is a block diagram of a system that includes a verification server to receive and test a vendor update provided by a vendor, according to some embodiments.

FIG. 2 is a block diagram of a system 200 that includes a verification server to receive and test a vendor update provided by a vendor, according to some embodiments. The system 200 illustrates details of the verification phase.

The broker server 108 may check with the backend server 104 to determine if a vendor update (e.g., the vendor update 144) has been received from one of the vendors 114. The broker server 108 may determine, based on the subscription database 138 and the configuration database 136, whether one of the client devices 102 has subscribed to the vendor update. For example, the broker server 108 may determine whether the configuration database 136 indicates that the client device 102(N) has a software or hardware component to which the vendor update 144 applies. After determining that the vendor update 144 (e.g., stored in the vendor update database 124) is to be sent to the particular client device 102, the broker server 108 may instruct the verification server 106 to verify that the vendor update 144 is unlikely to cause issues when installed in the client device 102(N).

To verify the vendor update 144 for the client 102(N), the verification module 130 may create a container, such as the container 134(N), retrieve the configuration data 140 sent by the client device 102(N) and stored in the configuration database 136, and configure the container 134(N) based on the configuration data 140. For example, the verification module 130 may configure the container 134(N) to replicate the client device 102(N) by installing, in the container 134(N), the software 116, the drivers 188, and virtual versions of the components 120 with the firmware 122. The verification module 130 may install the vendor update 144 in the container 134(N) that is configured to replicate the client device 102(N).

After installing the vendor update 144 in the container 134(N) that replicates the client device 102(N), the verification module 130 may perform the tests 128 to the container 134(N) in the order 146. Logs 202 generated by performing the tests 128 may be stored in the log collection 132. The logs 202 may, in some cases, be extracted using a monitor 208. For example, the monitor 208 may be a component of each of the client devices 102 and may be replicated in a container, such the container 134(N). The monitor 208 may be a hardware component, a software component, or a combination thereof. For example, the monitor 208 may be a controller card embedded in a motherboard of individual client devices 102, such as Dell® Remote Access Controller (iDRAC) or a similar tool. For example, the monitor 208 may be independent of the software 116 (e.g., including an operating system) and may enable remote access to logs and other data stored on the client device 102(N) (and on the corresponding container 134(N)) even when the client device 102(N) (or the corresponding container 134(N)) is powered off or otherwise inoperable. The monitor 208 may enable Systems Administrators to update and manage the client device 102(N), even when the client device 102(N) is turned off. The monitor 208 may provide a graphical user interface (e.g., web interface) and/or a command line interface to enable remote management of the client device 102(N) (and the corresponding container 134(N)). In some cases, the monitor 208 may be a software program, such as, for example, Dell® Support Assist or similar.

The verification module 130 may use the machine learning 126 to analyze the logs 202 and generate a report 204. If the logs 202 generated by performing the tests 128 indicate that the vendor update 144 causes issues to the replica container 134(N), then the logs 202 may be sent to one of the vendors 114 (e.g., the vendor that created the vendor update 144) to enable the vendor to address the issues. The vendor may analyze the logs 202, perform a root cause analysis, create a modified update 206 that addresses the issues, and send the modified update 206 to the manufacturer 112. The verification server 106 may determine whether the modified update 206 causes issues by creating a replica container based on configuration data associated with the client device 102(N), running the tests 128, and analyzing the logs 202. The logs 202 may include operating system logs, software application logs, driver logs, and firmware logs.

For example, for a client device that uses the Windows® operating system, the tests 128 may include testing: (1) hibernate (e.g., transitioning to a low power consumption mode from a normal mode), (2) full boot (e.g., transition from power-off to power-on to initiate the boot), (3) fast boot (e.g., power-on causes the operating system to load a system state stored in a hibernate file), (4) file handling (e.g., a file can be created, opened, written to, read from, and deleted without any issues), (5) memory footprint (e.g., determine that an amount of main memory that a software application uses while executing is within a normal range), and the like.

The verification module 130 may check properties of a device manager after the vendor update 144 is installed and after each test (e.g., hibernate, full boot, fast boot, and the like) to determine that there are no issues. For example, in Windows, the device manager may indicate an issue using a yellow exclamation mark ("!") or other similar marking. The verification module 130 may determine if an issue occurred by determining if an unrequested restart or reboot occurred, whether a system memory dump was created, whether a blue screen of death (BSOD) occurred, or whether another type of error response was initiated by the operating system. The verification module 130 may determine if an issue occurred by determining if a software application crashed or created a log indicating a problem (e.g., unable to access a file, unable to install a portion of the application, or the like).

The vendor update 144 may generate an installation log when the vendor update 144 is being installed in the container 134(N). The installation log may indicate whether the vendor update 144 was successfully installed. If the vendor update 144 was successfully installed, then the installation log may indicate there were no issues during the installation. If the vendor update 144 was not successfully installed, then the installation log may indicate that an issue occurred during the installation. After the vendor update 144 is installed, the vendor update 144 may create a log indicating an issue if the vendor update 144 encounters a problem, such being unable to access particular data, being unable to access a particular driver, being unable to access a particular hardware component, being unable to communicate with the operating system or another software application, or the like.

If the fast boot option is enabled, when a shutdown of the client device is requested, any running applications are closed and users are logged off and, while the operating system kernel is loaded and the system session is running, the operating system saves a current system state (e.g., including the kernel and drivers) to a hibernation file and powers off the client device. When the client device is powered-on, instead of the operating system loading the kernel, drivers, and system state individually, the operating system loads the random-access memory (RAM) with the system state (e.g., including the kernel and drivers) from the hibernation file, thereby reducing boot time.

If the verification module 130 determines that an issue is encountered, based on the logs 202, the verification module 130 may use the monitor 2082 retrieve various data and store the data in the log collection 132. For example, the log collection 132 may include which particular test of the tests 128 cause the issue, a type of the particular test, test parameters used by the particular test, data provided in the logs 202, parameters associated with the error, parameters that the vendors 114 have requested be collected, and the like.

The log collection 132 may be analyzed using the machine learning 126. For example, the machine learning 126 may be a classification algorithm, such as, for example, support vector machines (SVM) or the like. The machine learning 126 may analyze the log collection 132 and categorize the reasons for the failure of each test that failed among the tests 128. The tests 128 may be grouped according to a particular category, such as, for example, a hibernate issue, a boot issue, a file handling issue, a memory footprint issue, an operating system issue, a software application issue, a driver issue, a firmware issue, or the like. Each category may have an associated count. After categorizing a test failure, the machine learning 126 may increase the category count. In this way, a first set of tests having a first category may be performed before performing a second set of tests having a second category because the first category is more likely to cause a test failure then the second category, because the first category has a category count that is greater than the second category. The machine learning 126 may modify the order 146 in which the tests 128 are performed based on the categories and associated counts such that, particular tests that frequently cause a failure (e.g., an issue) are performed before other tests that are less likely to cause a failure (e.g., an issue). Thus, the order 146 in which the tests 128 are performed may be dynamically modified based on the log collection 132 after each vendor update is tested.

In this way, the client avoids receiving and installing a vendor update that is likely to cause issues. Instead, when a manufacturer receives a vendor update that is applicable to a client device, the manufacturer creates a replica of the configuration of the client device, installs the vendor update in the replica, and tests the vendor update to determine whether the vendor update causes issues in the replica. If the vendor update causes issues in the replica, then the vendor update is sent to the vendor, along with logs generated by performing the tests, to enable the vendor to modify the update to address the issues. If the vendor update does not cause issues in the replica, then the vendor update is sent to the vendor, along with logs generated by performing the tests, to enable the vendor to modify the update to address the issues.

Figure 3:
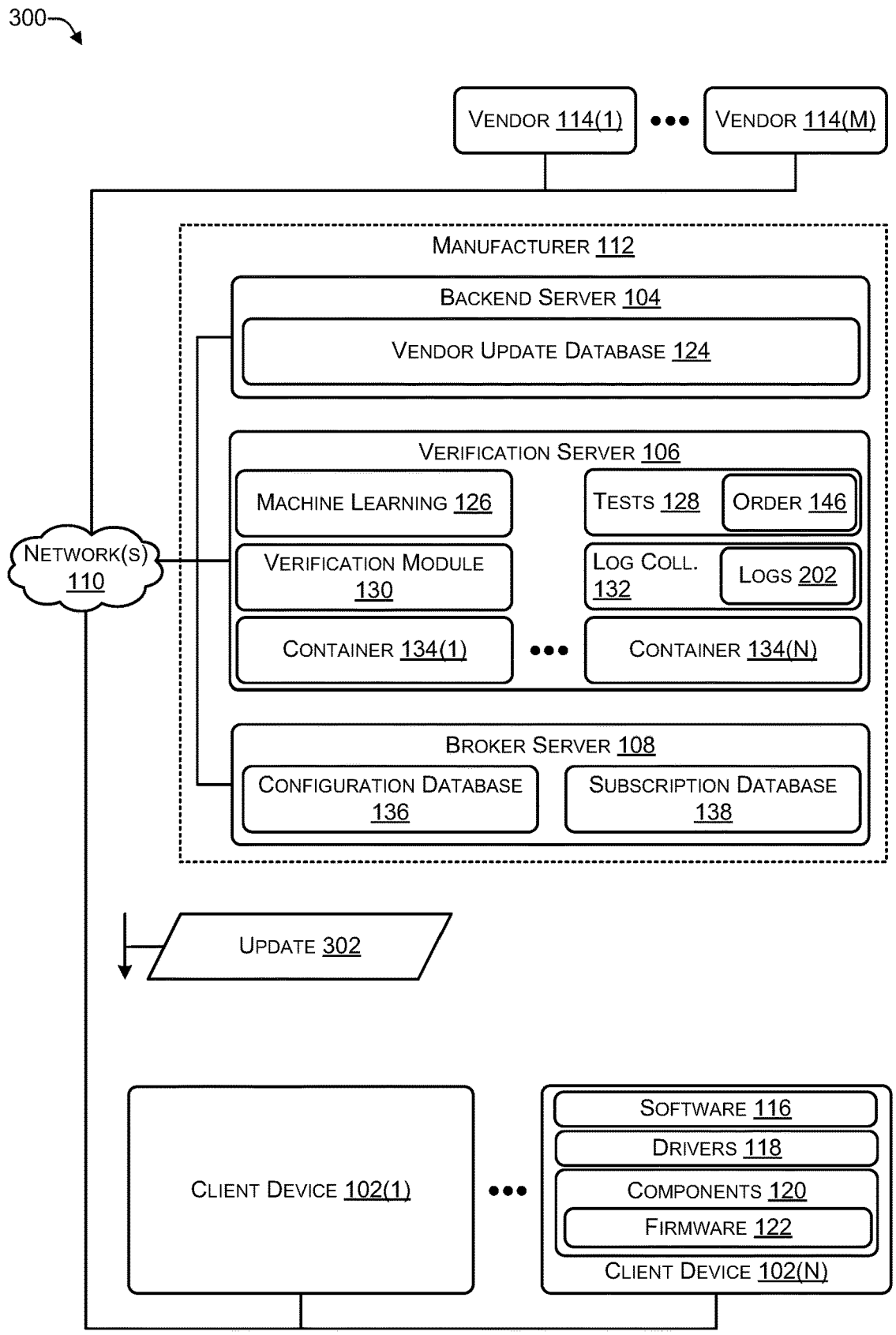
FIG. 3 is a block diagram of a system that includes a verification server to send an update to a client device after verifying the update, according to some embodiments.

FIG. 3 is a block diagram of a system 300 that includes a verification server to send an update to a client device after verifying the update, according to some embodiments. The system 300 illustrates details of the update phase.

After installing a vendor update (e.g., the vendor update 144 of FIGS. 1 and 2) in the container 134(N) that replicates the client device 102(N), the verification module 130 may perform the tests 128 to the container 134(N) in the order 146. The logs 202 generated by performing the tests 128 may be stored in the log collection 132 and analyzed to determine whether the vendor update causes issues to the replica container 134(N). If the logs 202 indicate that the vendor update causes issues, then the logs 202 may be sent to one of the vendors 114 (e.g., the vendor that created the vendor update) to enable the vendor to address the issues. The vendor may analyze the logs 202 and create a modified update that addresses the issues and send the modified update to the manufacturer 112. The verification server 106 may determine whether the modified update causes issues by performing the tests 128 to a container that is a replica of the client device.

After the verification server 106 determines, based on testing a container that is a replica of the client device that includes the vendor update, that the vendor update does not cause any issues, the verification server 106 may indicate to the broker server 108 that the vendor update may be sent to the client device for installation. The broker server 108 may send an update 302 to one or more of the client devices 102 that have a configuration similar or identical to the configuration that was tested using a replica container. For example, the update 302 may be the vendor update 144 of FIGS. 1 and 2 or the modified update 206 of FIG. 2. In this way, the update 302 is sent to one of the client devices 102 after the verification server 106 determines, based on testing the update 302 using a replica container, that the update 302 does not cause issues to the replica container. This process provides several advantages. First, the client may not take the client device 102 off-line for a significant amount of time because the update 302 has previously been tested on a replica configuration, thereby reducing the amount of time that the client device 102 is off-line. For example, the client may perform fewer tests after installing the update 302 or the tests that the client performs may be performed quickly because the tests do not cause issues. Second, after installing the update 302, the client may not encounter significant issues that disrupt the client's business because the update 302 was previously tested on a replica configuration. Third, the manufacturer may achieve greater customer satisfaction with clients because the updates are unlikely to cause significant issues when installed on the client devices.

Figure 4:
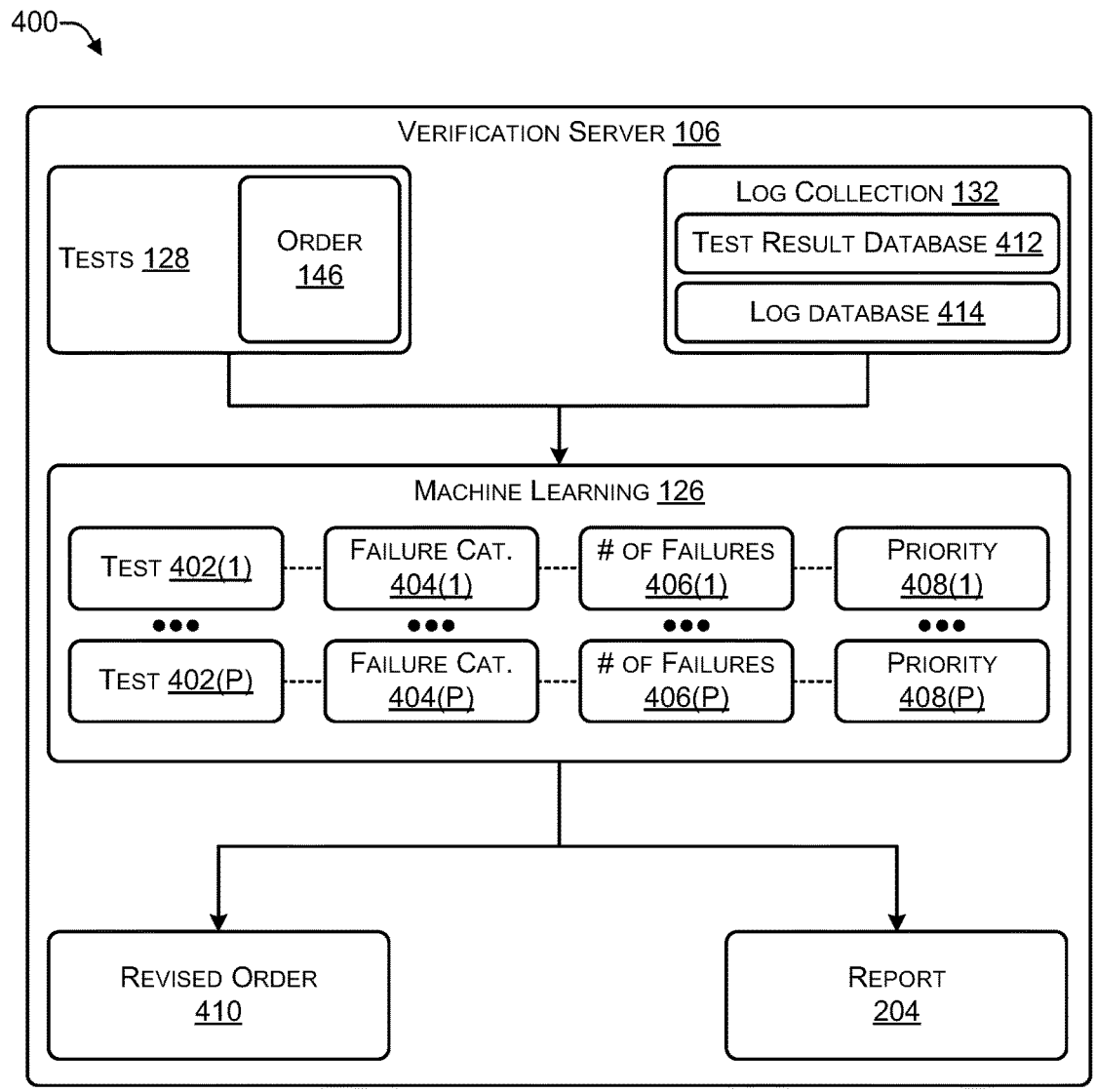
FIG. 4 is a block diagram of a system that includes using machine learning to categorize test failures and revising an order in which tests are performed, according to some embodiments.

FIG. 4 is a block diagram of a system 400 that includes using machine learning to categorize test failures and revising an order in which tests are performed, according to some embodiments. The machine learning 126 may analyze the tests 128 that failed. For example, the tests 128 may include a test 402(1) to a test 402(P) (P>0) that failed. The machine learning 126 may categorize each test 402 that failed into a particular failure category 404. For example, the test 402(1) may have a failure category 404(1) and the test 402(P) may have a failure category 404(P). The machine learning 126 may determine how many failures have occurred for each of the failure categories 404. For example, the machine learning 126 may determine a number of failures 406(1) for the failure category 404(1) and the number of failures 406(P) for the failure category 404(P). The machine learning 126 may assign a priority 408 to each of the tests 402 based on the number of failures 406 associated with each of the tests 402. For example, the test 402(1) may be assigned a priority 408(1) and the test 402(P) may be assigned a priority 408(P). Based on the priorities 408, the machine learning 126 may create a revised order 410 in which to perform the tests 402. For example, a test 402(X) may be performed before a test 402(Y) (P>=X>Y>0) if the test 402(X) has a higher number of failures 406 (and therefore a higher priority 408) then the test 402(Y). Thus, the revised order 410 may be designed to perform tests that are more likely to fail before tests that are less likely to fail. The machine learning 126 may create the report 204. The report 204 may include information specified by the vendors 114, such as which test caused a failure, test parameters associated with the test, configuration data associated with the container being tested, logs (e.g., operating system logs, application logs, driver logs, system dumps, and the like) generated as a result of performing the test, and other data.

The machine learning 126 may determine the revised order 410 and the report 204 using the logs 202 generated by performing the tests 128 to a particular of the containers 134 configured to replicate one of the client devices 102 and including the vendor update 144. The machine learning 126 may determine the revised order 410 in the report 204 using the log collection 132. The log collection 132 may include a test result database 412 and a log database 414. The log database 414 may include historical logs (e.g., including but not limited to the logs 202) generated by performing the tests 128 on multiple containers 134 over a period of time, such as several months, a year, or several years. The test result database 412 may include results of the performing the tests 128 that do not result in logs, such as a blue screen of death (BSOD), a system dump, a software application crash, or other relevant issue that may not result in the generation of a log.

In some cases, the report 204 may include suggestions to modify a configuration of one of the client devices 102 of FIG. 1. For example, the machine learning 126 may determine that the tests 402 have failed due to a configuration issue associated with one of the client devices 102, such as, for example, insufficient random access memory, insufficient storage devices, storage devices with slow access speeds, a queue size that is too small, an incorrectly configured BIOS, an incorrectly configured modem, an incorrectly configured graphics card, and the like. The report 204 may include recommendations, such as, for example, increasing an amount of random access memory, adding an additional storage device, adding a storage device with faster access speeds, reconfiguring a queue to have a bigger size, reconfiguring one or more BIOS parameters, reconfiguring one or more modem parameters, reconfiguring one or more graphics parameters, and the like.

Figure 5:
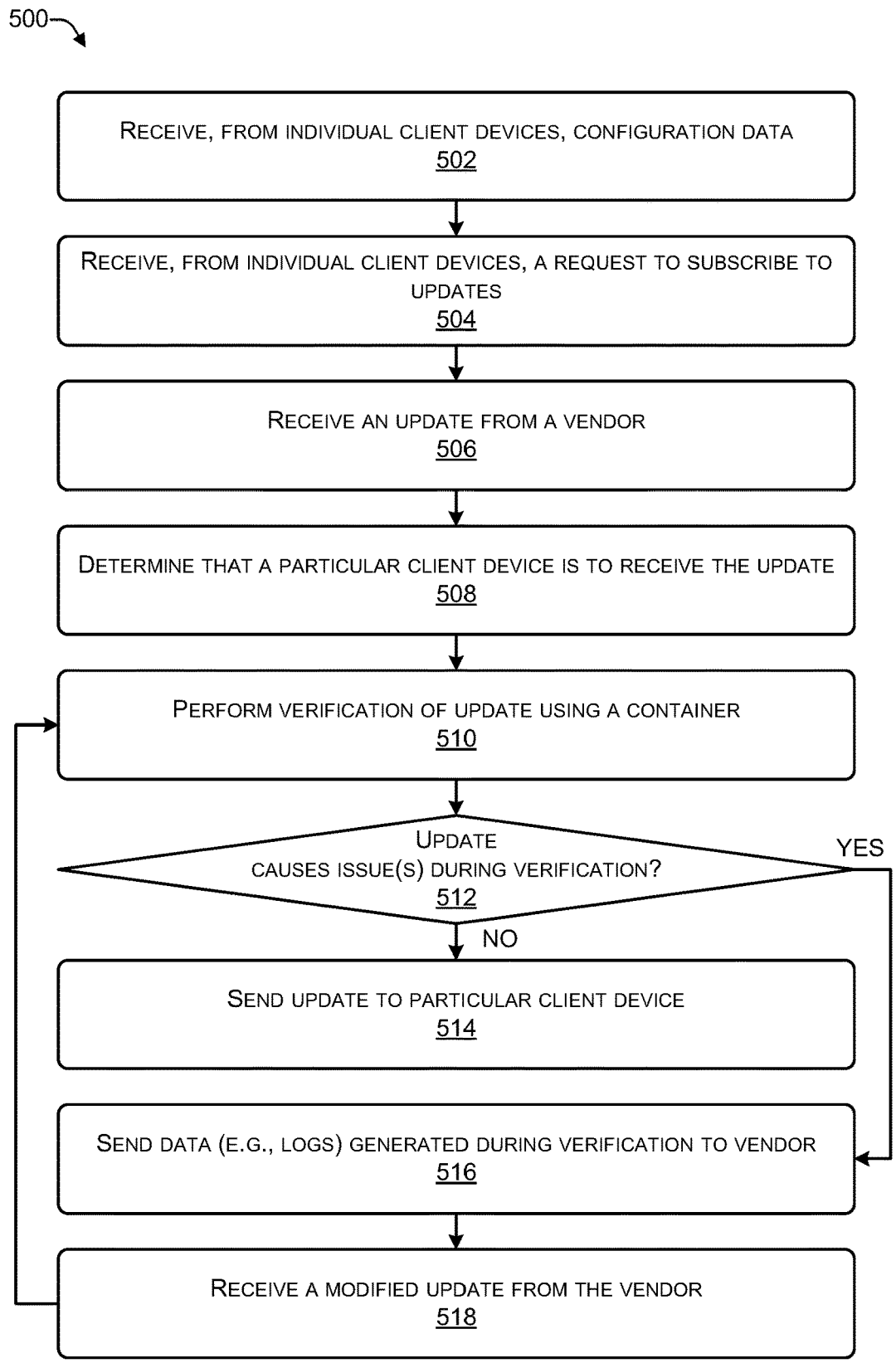
FIG. 5 is a flowchart of a process that includes verifying an update before sending the update to a client, according to some embodiments.
Figure 6:
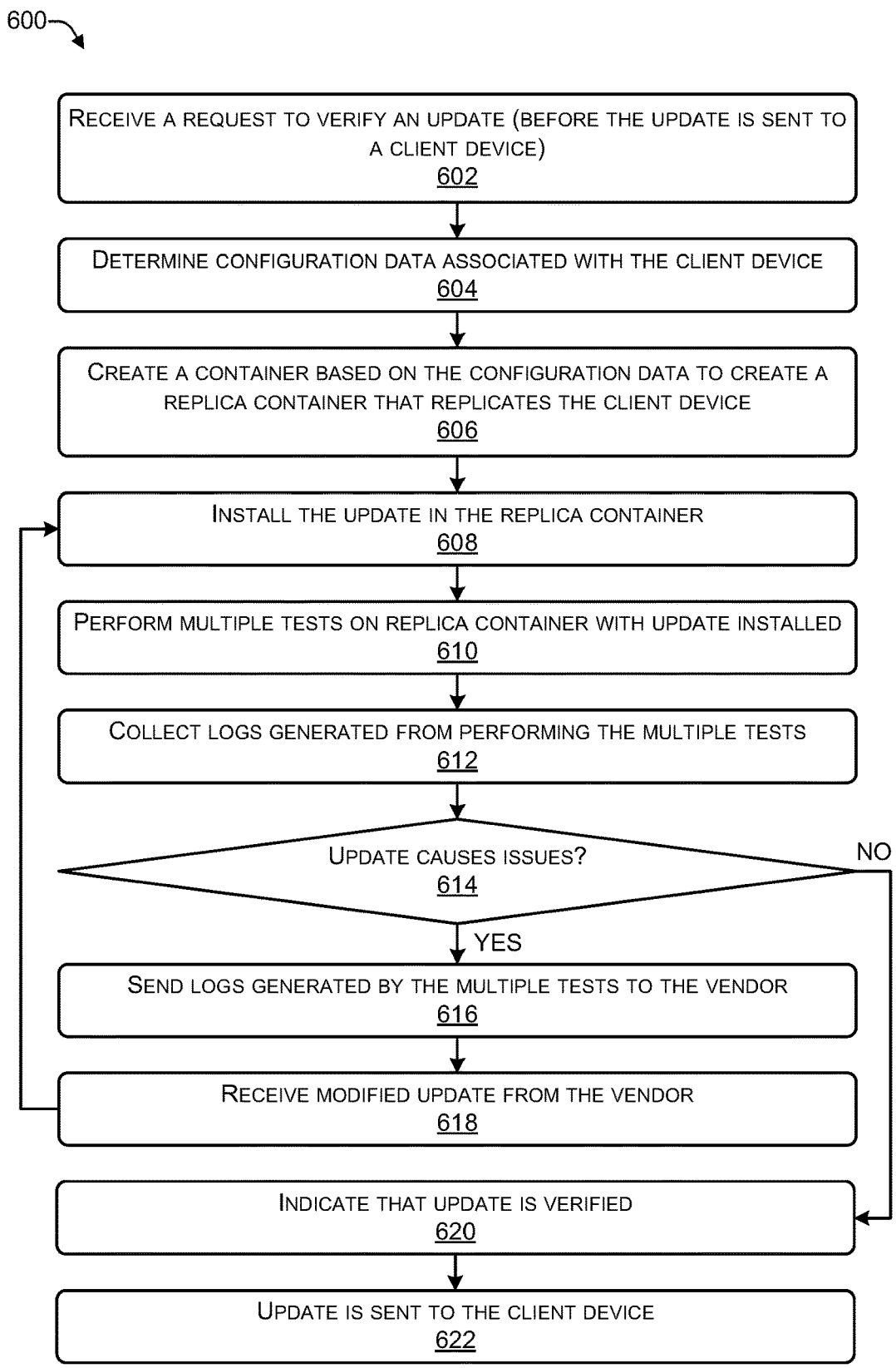
FIG. 6 is a flowchart of a process that includes performing multiple tests on a replica container that replicates a configuration of a client server, according to some embodiments.
Figure 7:
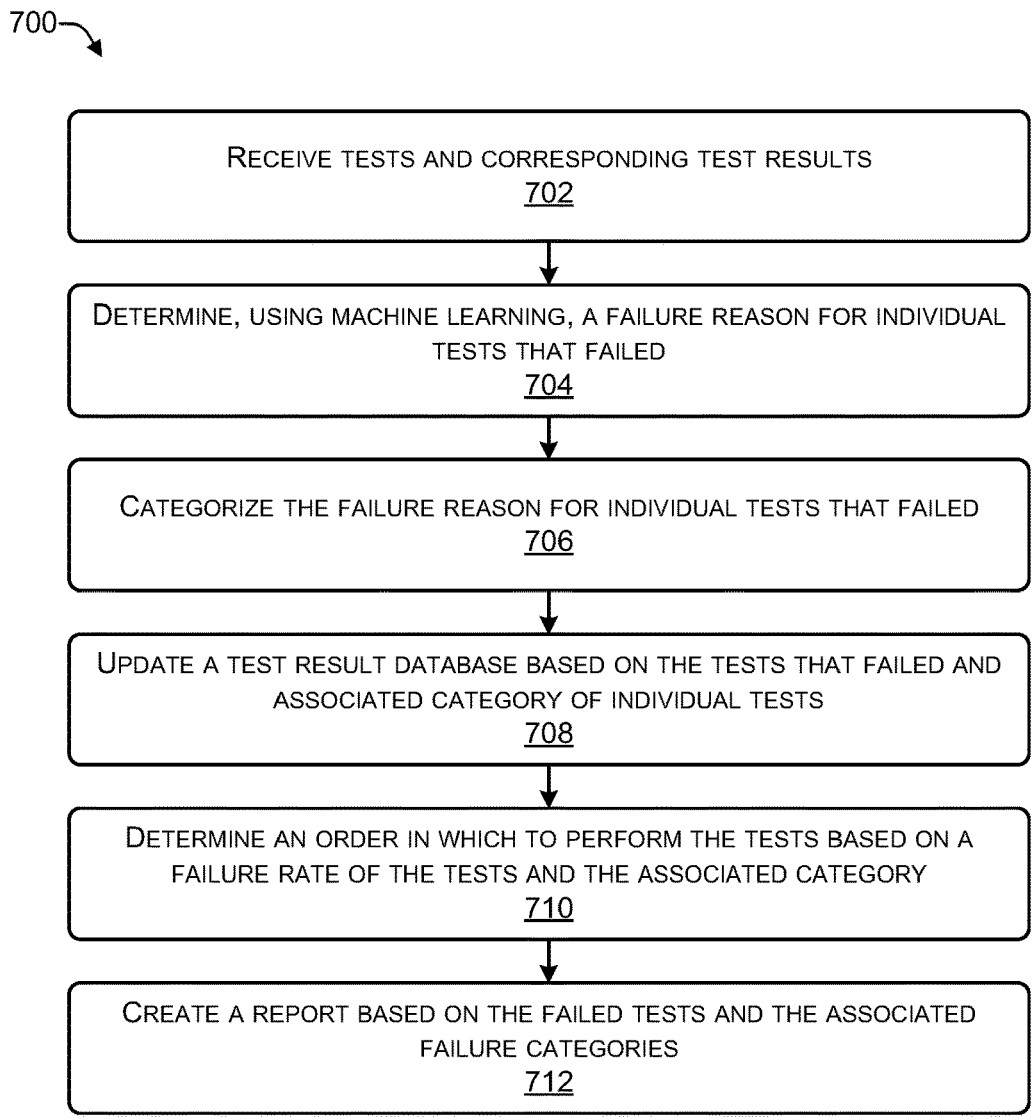
FIG. 7 is a flowchart of a process that includes determining an order in which to perform tests to verify whether an update causes issues, according to some embodiments.

In the flow diagram of FIGS. 5, 6, and 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600, and 700 are described with reference to FIGS. 1, 2, 3, and 4 as described above, although other models, frameworks, systems and environments may be used to implement these processes.

FIG. 5 is a flowchart of a process 500 that includes verifying an update before sending the update to a client, according to some embodiments. For example, the process 500 may be performed by one or more of the servers 104, 106, 108 of FIGS. 1, 2, 3, and 4.

At 502, the process may receive configuration data from individual client devices. At 504, the process may receive a request to subscribe to updates (e.g., software updates or firmware updates) from the individual client devices. For example, in FIG. 1, one or more of the client devices 102 may send the configuration data 140, the subscription request 142, or both to a server, such as the broker server 108, of the manufacturer 112.

At 506, the process may receive an update from a vendor. At 508, the process may determine that a particular client device is to receive the update. For example, in FIG. 1, one of the vendors 114 may send the vendor update 144 to the manufacturer 112. The broker server 108 may determine, based on the configuration database 136, the subscription database 138, or both, that the vendor update 144 is applicable to one or more of the client devices 102. For example, the broker server 108 may determine that the vendor update 144 is an update to (i) a BIOS, (ii) an operating system, (iii) a software application, (iv) a device driver, or (v) a firmware of a hardware component that is installed on the client device 102(N). Thus, the broker server 108 may determine, based on the configuration database 136, that the vendor update 144 is applicable to (e.g., installable in) a particular client device of the client devices 102 and may determine, based on the subscription database 138, that the particular client device has subscribed to updates.

At 510, the process may perform a verification of the update using a container (e.g., this process is described in more detail in FIG. 6). At 512, a determination may be made whether the update caused an issue to the container during the verification. If the process determines, at 512, that "no", the update did not cause any issues to the container during verification, then the process may send the update to the particular client device, at 514. For example, in FIG. 2, the verification server 106 may create the container 134(N) and configure the container 134(N) based on configuration data associated with the corresponding client device, such as the client device 102(N). For example, the software 116, including an operating system and software applications installed in the client device 102(N) may be replicated in the container 134(N). The drivers 118 installed in the client device 102(N) may be replicated in the container 134(N). The hardware components 120 and the corresponding firmware 122 included in the client device 102(N) may be replicated in the container 134(N). In this way, the container 134(N) may be configured as a replica of the client device 102(N). The vendor update 144 may be installed in the container 134(N) and the tests 128 performed to the container 134(N). For example, the tests 128 may include performing a normal boot, performing a fast boot, performing a hibernate, determining a memory footprint associated with one or more software applications, file handling, other types of tests, or any combination thereof. The logs 202 generated as a result of performing the tests 128 may be analyzed to determine if the update caused any issues (e.g., BSOD, memory corruption, unrequested reboot, system memory dump, error log, or the like). If the verification server 106 determines that installing the vendor update 144 to the container 134(N) (e.g., that replicates the client device 102(N)) does not cause any issues, then the manufacturer 112 may send the vendor update 144 to the client device 102(N).

If the process determines, at 512, that the update caused an issue to the container during the verification process, then the process may send data (e.g., logs, memory dumps, and the like) generated during the verification process to the vendor, at 516. At 518, the process may receive a modified update from the vendor. For example, the modified update may address the issues that were caused during the verification process. The process may proceed to 510 to verify the modified update using the container. The process may repeat 510, 512, 516, and 518 until the update does not cause any issues during the verification process. For example, in FIG. 2, if the verification server 106 determines that installing the vendor update 144 to the container 134(N) (e.g., that replicates the client device 102(N)) causes at least one issue, then the manufacturer 112 may send the vendor update 144 to a particular vendor of the vendors 114 that created the vendor update 144 along with the logs 202 that were generated when testing the vendor update 144. The particular vendor may send the modified update 206 to the manufacturer 112. The particular vendor may modify the vendor update 144 to create the modified update 2062 address the issues (e.g., indicated by the logs 202). The verification server 106 may uninstall the vendor update 144 from the container 134(N) and install the modified update 206 in the container 134(N) and perform the tests 128 to the container 134 to determine if the modified update 206 causes issues. The process (e.g., 510, 512, 516, 518) of receiving an update from one of the vendors 114 and testing the update in a container replicating a client device may be repeated until the testing reveals that no issues were caused by the update. After the verification server 106 determines that the modified update 206 does not cause any issues, the verification server 106 may send the modified update 206 to the client device 102(N).

Thus, a server of a manufacturer may receive a vendor update from a vendor. The vendor update may update software, such as an operating system, a software application, or a driver installed on a client device, or the vendor update may update firmware such as, a BIOS or a firmware of a hardware component of a client device. The server may determine the client devices to which the vendor update is applicable (e.g., installable on). Prior to sending the vendor update to the client device, the server may verify that the vendor update does not cause issues (e.g., undesirable outcomes caused by installing the vendor update). For example, the server may create a container, configure the container using configuration data associated with a particular client device to create a replica container, and install the vendor update in the replica container. The server may perform a variety of tests on the replica container with the vendor update installed, such as, for example, a normal boot, a fast boot, a hibernate operation, determining whether a software applications memory footprint changes, and the like. If the logs and system events (e.g., memory dump) generated as a result of performing the tests on the replica container indicate that the vendor update did not cause any issues, then the server may send the vendor update to the client device for installation on the client device. If the logs and system events generated as a result of performing the tests indicate that the vendor update caused at least one issue, then the server may send the logs and system events generated during testing to the vendor. The vendor may modify the vendor update to create a modified update to address the at least one issue and send the modified update to the server. The server may test the modified update in the replica container to determine if the modified update causes any issues. If the modified update does not cause any issues, then the modified update may be sent to the client device. If the modified update causes at least one issue, then the modified update may be sent, along with applicable logs and system events, to the vendor for further modification. In this way, the client device may not receive a vendor update that causes an issue because the server tests each vendor update using a container that is a replica of the client device prior to sending the vendor update, thereby improving client satisfaction and reducing the downtime of the client device when installing the vendor update.

FIG. 6 is a flowchart of a process 600 that includes performing multiple tests on a replica container that replicates a configuration of a client server, according to some embodiments. The process 600 may be performed by a server of a manufacturer, such as the verification server 106 of FIGS. 1, 2, 3, and 4.

At 602, the process may receive a request to verify an update before the update is sent to a client device. For example, in FIG. 1, the broker server 108 may determine based on the configuration database 136 and the subscription database 138 that the vendor update 144 stored in the vendor update database 124 is applicable to a particular client device, such as the client device 102(N) and instruct the verification server 106 to verify the vendor update 144 prior to the broker server 108 sending the vendor update 144 to the client device 102(N).

At 604, the process may determine configuration data associated with the client device. At 606, the process may create a container based on the configuration data to create a replica container that replicates the client device. At 608, the process may install the update in the replica container. For example, in FIG. 1, the verification server 106 may determine the configuration data 140 associated with the client device 102(N) by accessing the configuration data 140 stored in the configuration database 136. The verification server 106 may create the container 134(N) and configure the container 134(N) based on the configuration data 140 to create a replica container that replicates the client device 102(N). The verification server 106 may install the vendor update 144 in the container 134(N) that replicates the client device 102(N).

At 610, the process may perform multiple tests on the replica container with the update installed. At 612, the process may collect logs generated from performing the multiple tests. At 614, the process may analyze the logs to determine if the update causes issues to the replica container with the update installed. For example, in FIG. 2, the verification module 130 may perform the tests 128 (e.g., in the order 146) to the container 134(N) with the vendor update 144 installed. The verification server 106 may collect the logs 202 generated by performing the tests 128 to the container 134(N). The verification module 130 may analyze the logs 202 generated by performing the tests 128 to the container 134(N) with the vendor update 144 installed. For example, the machine learning 126 may be used to analyze the logs 202 and previously gathered logs stored in the log collection 132.

If the process determines at 614, that the update causes issues to the replica container with the update installed, then the process may, at 616, send the logs generated by the multiple tests to the vendor. At 618, the process may receive a modified update from the vendor and the process map may proceed to 608, to install the modified update in the replica container. In this way, 608, 610, 612, 614, 616, and 618 may be repeated until the process determines that the update received from the vendor does not cause any issues when installed in the replica container that includes the update. For example, in FIG. 2, if the verification module 130 determines that the logs 202 indicate at least one issue, then the verification server 106 may send the logs 202 to a particular vendor (e.g., one of the vendors 114). The particular vendor may modify the update to create the modified update 206 to address the issue(s) and send the modified update 206 to the verification server 106. The verification server 106 may uninstall the vendor update 144, install the modified update 206 in the container 134(N), and perform the tests 128 to the container 134(N) with the modified update 206 installed. If the logs 202 generated as a result of performing the tests 128 indicate that the modified update 206 caused at least one issue, then the logs 202 may be sent to the particular vendor for further modification.

If the process determines, at 614, that the update does not cause any issues based on the logs (e.g., generated by performing multiple tests to the replica container with the update installed), then the process may proceed to 620, and indicate that the update is verified. Indicating that the update is verified may cause, at 622, a server of the manufacturer to send the update to the client device. For example, in FIG. 3, if the verification server 106 determines that the logs 202 indicate that the vendor update 144 or the modified update 206 do not cause any issues, then the verification server 106 may indicate that the update 302 (e.g., either the vendor update 144 or the modified update 206) has been verified. In response, the broker server 108 may send the update 302 to individual ones of the client devices 102 that have a same configuration (e.g., based on the configuration database 136) as the configuration that was used to test the update 302 in the container 134(N) and that have subscribed (e.g., based on the subscription database 138) to an update.

Thus, a server of a manufacturer may receive a vendor update from a vendor. The vendor update may update software, such as an operating system, a software application, or a driver installed on a client device, or the vendor update may update firmware such as, a BIOS or a firmware of a hardware component of a client device. The server may determine the client devices to which the vendor update is applicable (e.g., installable on). Prior to sending the vendor update to the client device, the server may verify that the vendor update does not cause issues (e.g., undesirable outcomes caused by installing the vendor update). For example, the server may create a container, configure the container using configuration data associated with a particular client device to create a replica container, and install the vendor update in the replica container. The server may perform a variety of tests on the replica container with the vendor update installed, such as, for example, a normal boot, a fast boot, a hibernate operation, determining whether a software applications memory footprint changes, and the like. If the logs and system events (e.g., memory dump) generated as a result of performing the tests on the replica container indicate that the vendor update did not cause any issues, then the server may send the vendor update to the client device for installation on the client device. If the logs and system events generated as a result of performing the tests indicate that the vendor update caused at least one issue, then the server may send the logs and system events generated during testing to the vendor. The vendor may modify the vendor update to create a modified update to address the at least one issue and send the modified update to the server. The server may test the modified update in the replica container to determine if the modified update causes any issues. If the modified update does not cause any issues, then the modified update may be sent to the client device. If the modified update causes at least one issue, then the modified update may be sent, along with applicable logs and system events, to the vendor for further modification. In this way, the client device may not receive a vendor update that causes an issue because the server tests each vendor update using a container that is a replica of the client device prior to sending the vendor update, thereby improving client satisfaction and reducing the downtime of the client device when installing the vendor update.

FIG. 7 is a flowchart of a process 700 that includes determining an order in which to perform tests to verify whether an update causes issues, according to some embodiments. For example, the process 700 may be performed by the machine learning 126 of FIGS. 1, 2, 3, and 4.

At 702, the process may receive tests and corresponding test results. For example, in FIG. 4, the machine learning 126 may receive the tests 128 and the log collection 132 that include the logs generated by performing the tests 128 to a replica container that includes a vendor update. A test of the tests 128 may fail if the test causes an issue, such as an error log, a system dump or another type of undesirable result.

At 704, the process may determine, using machine learning, a failure reason for individual tests that failed. At 706, the failure reason may be categorized for individual tests that failed. For example, in FIG. 4, the machine learning 126 may determine a failure reason associated with each of the tests 402 that failed and categorize the reason to create an associated category 404 for each of the tests 402.

At 708, the process may update a test result database to include the tests that failed and the associated category. At 710, the process may determine an order in which to perform the tests based on the failure rate of the tests and the associated category. For example, in FIG. 4, the machine learning 126 may update the test result database 412 based on categorizing the tests 402. Based on the number of failures 406 associated with each failure category 404, the machine learning 126 may determine a priority 408 associated with each of the tests 402 that failed. The machine learning 126 may take the order 146 and, based on the number of failures 46 and the priority 408, create the revised order 410 in which to perform the tests 128.

At 712, the process may create a report based on the failed tests and the associated failure categories. For example, the report may be designed to aid the vendor in modifying the update to address the failure of one or more test(s). For example, the analysis of the test failures may indicate that a particular test (e.g., hibernation) causes failures whereas other tests (e.g., normal boot, fast boot) do not cause failures. In addition, the report may include data requested by the vendor to assist the vendor in addressing the failures to create the modified update. For example, the report may include test parameters of the test, configuration data of the client device, logs, and other data (e.g., requested by the vendor).

Thus, machine learning may be used to categorize a failure reason for each test that failed (e.g., caused an issue during testing). The number of failures per category may be tabulated and used to reorder the order in which the tests are to be performed to the replica container that includes the vendor update (or modified update). In this way, the order of the tests may be designed to identify failures as early as possible by performing a test that is more likely to fail before performing a test that is less likely to fail.

Figure 8:
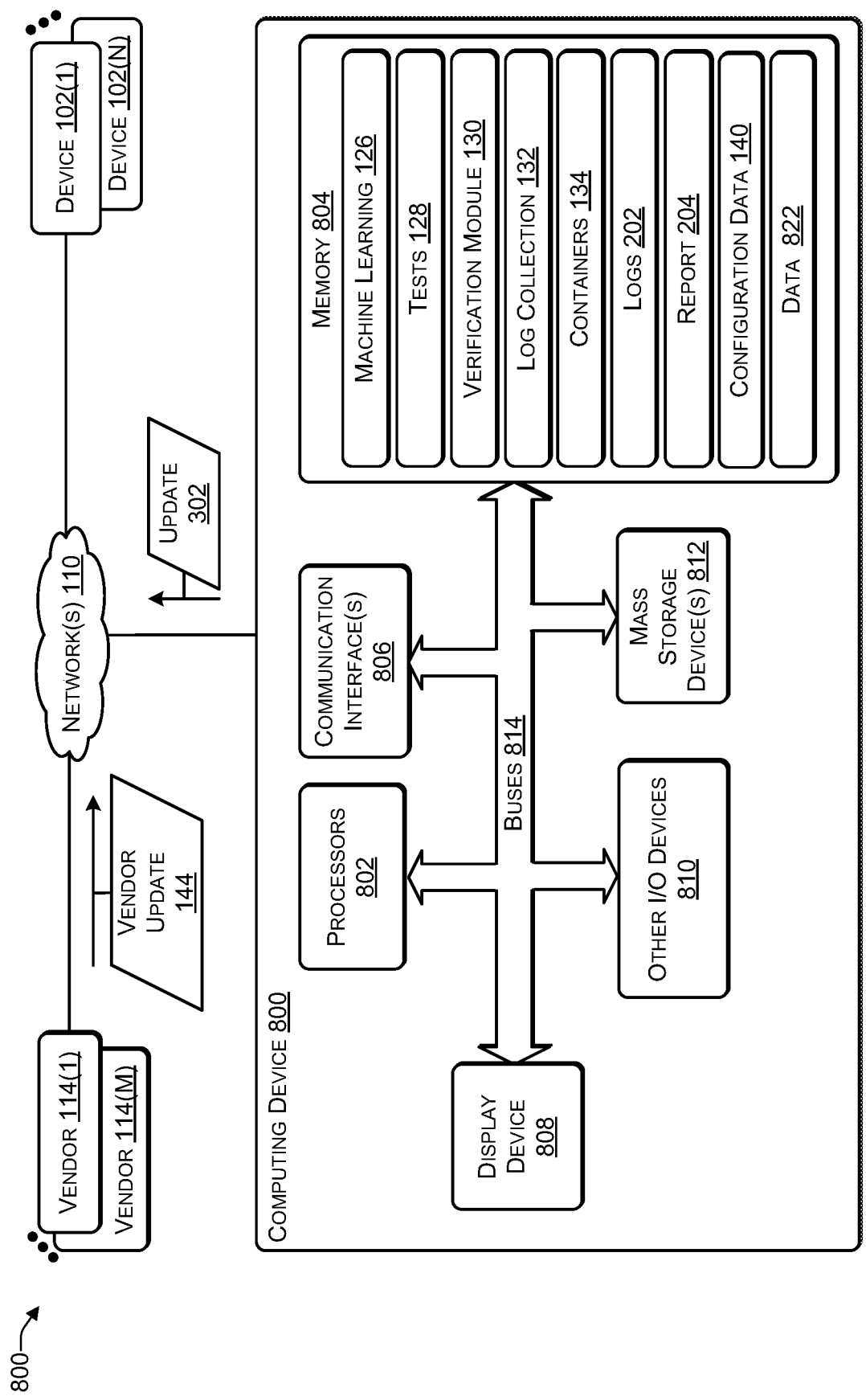
FIG. 8 illustrates an example configuration of a computing device that can be used to implement the systems and techniques described herein.

FIG. 8 illustrates an example configuration of a computing device 800 that can be used to implement the systems and techniques described herein, such as for example, the client devices 102, the servers 104, 106, 108 and the vendor servers 114 of FIGS. 1, 2, and 3. For illustration purposes, the computing device 800 is shown as implementing the servers 104, 106, 108 of FIG. 1.

The computing device 800 may include one or more processors 802 (e.g., including a central processing unit (CPU), a graphics processing unit (GPU), and the like), a memory 804, communication interfaces 806, a display device 808, other input/output (I/O) devices 810 (e.g., a keyboard, a trackball, and the like), and one or more mass storage devices 812 (e.g., disk drive, solid state disk drive, or the like), configured to communicate with each other, such as via one or more system buses 814 or other suitable connections. While a single system bus 814 is illustrated for ease of understanding, it should be understood that the system buses 814 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 802 are one or more hardware devices that may include a single processing unit or a number of processing units, all of which may include single or multiple computing units or multiple cores. The processors 802 may include a graphics processing unit (GPU) that is integrated with a CPU or the GPU may be a separate processor device from the CPU. The processors 802 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 802 may be configured to fetch and execute computer-readable instructions stored in the memory 804, mass storage devices 812, or other computer-readable media.

Memory 804 and mass storage devices 812 are examples of computer storage media (e.g., memory storage devices) for storing instructions that can be executed by the processors 802 to perform the various functions described herein. For example, memory 804 may include both volatile memory and non-volatile memory (e.g., RAM, ROM, or the like) devices. Further, mass storage devices 812 may include hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices 812 may be collectively referred to as memory or computer storage media herein and may be any type of non-transitory media capable of storing computer-readable, processor-executable program instructions as computer program code that can be executed by the processors 802 as a particular machine configured for carrying out the operations and functions described in the implementations herein.

The computing device 800 may include one or more communication interfaces 806 for exchanging data via the network 110. The communication interfaces 806 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 806 can also provide communication with external storage, such as a storage array, network attached storage, storage area network, cloud storage, or the like.

The display device 808 may be used for displaying content (e.g., information and images) to users. Other I/O devices 810 may be devices that receive various inputs from a user and provide various outputs to the user, and may include a keyboard, a touchpad, a mouse, a printer, audio input/output devices, and so forth.

The computer storage media, such as memory 804 and mass storage devices 812, may be used to store software and data. For example, the computer storage media may be used to store the machine learning 126, the tests 128, the verification module 130, the log collection 132, the containers 134, the logs 202, the report 204, and other data 822.

Thus, the vendors 114 may provide software (e.g., operating system, software applications) or hardware components (e.g., camera, keyboard, disk driver, modem, graphics card, and the like) used in the client devices 102. The vendors 114 may provide the vendor update 144 to the software (e.g., operating system, applications, device drivers, or the like) or the firmware of hardware components that are included in the client devices 102. The manufacturer of the client devices 102 may use the computing device 800 to verify that installing the vendor update 144 does not cause any issues by creating one of containers 134 and replicating a configuration of one or more of the client devices 102 based on the configuration data 140 previously sent to the computing device 800. The computing device 800 may install the vendor update 144 in the replica container 134 and performing the tests 128. The computing device 800 may analyze the logs 202 generated by performing the tests 128 to determine if the vendor update 144 caused any issues. If no issues were caused by performing the tests 128 then the vendor update 144 may be released, e.g., sent or made available for download to one or more of the client devices 102 to which the vendor update 144 is applicable. If the computing device 800 determines that performing the tests 128 caused issues, then the computing device 800 may analyze the logs 202 and create the report 204. The report 204 may include data that the vendors 114 may use to modify the vendor update 144. The report 204 may include recommendations to modify a configuration of the software and/or hardware of the client device 102 to address the issues.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, by one or more processors, a vendor update from a vendor;
   determining, by the one or more processors and based on configuration data associated with a client device, that the vendor update is installable in the client device;
   creating, by the one or more processors, a container;
   configuring the container, by the one or more processors and based on the configuration data associated with the client device, to replicate a configuration of the client device to create a replica container;
   installing, by the one or more processors, the vendor update in the replica container;
   performing, by the one or more processors, a plurality of tests to the replica container with the vendor update installed to generate a set of logs, the plurality of tests including (1) performing a normal boot, (2) performing a fast boot, (3) performing a hibernate followed by a boot from hibernate, (4) performing a set of file handling tests including creating a file, opening the file, writing to the file, reading from the file, and deleting the file, and (5) determining a memory footprint of at least one software application executing on the client device;
   performing, by the one or more processors, an analysis of the set of logs;

determining, by the one or more processors and based on the analysis, that the vendor update caused no issues; and sending the vendor update to the client device.

2. The method of claim 1, further comprising:

determining, by a machine learning algorithm, a test category associated with individual tests of the plurality of tests;

determining, by the machine learning algorithm and based on multiple sets of logs generated by performing the plurality of tests to multiple vendor updates, a frequency of failure of individual test categories; and determining, by the machine learning algorithm and based on the frequency of failure of the individual test categories, an order in which to perform the tests.

3. The method of claim 1, further comprising:

receiving a second vendor update from the vendor;

uninstalling the vendor update from the replica container;

installing the second vendor update in the replica container;

performing the plurality of tests to the replica container with the second vendor update installed to generate a second set of logs;

performing a second analysis of the second set of logs;

determining, based on the second analysis, that the second vendor update caused at least one issue; and sending the second vendor update and the second set of logs to the vendor.

4. The method of claim 3, further comprising:

receiving a modified update from the vendor;

uninstalling the second vendor update from the replica container;

installing the modified update in the replica container;

performing the plurality of tests to the replica container with the modified update installed to generate a third set of logs;

performing a third analysis of the third set of logs;

determining, based on the third analysis, that the modified update causes no issues; and sending the modified update to the client device.

5. The method of claim 1, wherein the vendor update comprises at least one of:

an operating system update to an operating system that is installed on the client device;

a software application update to a software application that is installed on the client device;

a driver update to a driver that is installed on the client device;

a basic input output system (BIOS) update to a BIOS of the client device; and a firmware update to a firmware of a hardware component of the client device.

6. The method of claim 1, further comprising:

receiving the configuration data from the client device, the configuration data comprising:

an operating system version that is installed on the client device;

a software application version that is installed on the client device;

a driver version that is installed on the client device;

a basic input output system (BIOS) version of the client device; or a firmware version installed in a hardware component included in the client device.

7. A computing device comprising:

one or more processors; and one or more non-transitory computer-readable media storing instructions that are executable by the one or more processors to perform operations comprising:

receiving a vendor update from a vendor;

determining, based on configuration data associated with a client device, that the vendor update is associated with the client device;

creating a container;

configuring the container, based on the configuration data associated with the client device, to replicate a configuration of the client device to create a replica container;

installing the vendor update in the replica container;

performing a plurality of tests to the replica container with the vendor update installed to generate a set of logs, the plurality of tests including (1) performing a normal boot, (2) performing a fast boot, (3) performing a hibernate followed by a boot from hibernate, (4) performing a set of file handling tests including creating a file, opening the file, writing to the file, reading from the file, and deleting the file, and (5) determining a memory footprint of at least one software application executing on the client device;

performing an analysis of the set of logs;

determining, based on the analysis, that the vendor update caused no issues; and sending the vendor update to the client device.

8. The computing device of claim 7, the operations further comprising:

determining, by a machine learning algorithm, a test category associated with individual tests of the plurality of tests;

determining, by the machine learning algorithm and based on multiple sets of logs generated by performing the plurality of tests to multiple vendor updates, a frequency of failure of individual test categories; and determining, by the machine learning algorithm and based on the frequency of failure of the individual test categories, an order in which to perform the tests.

9. The computing device of claim 7, the operations further comprising:

receiving a second vendor update from the vendor;

uninstalling the vendor update from the replica container;

installing the second vendor update in the replica container;

performing the plurality of tests to the replica container with the second vendor update installed to generate a second set of logs;

performing a second analysis of the second set of logs;

determining, based on the second analysis, that the second vendor update caused at least one issue; and sending the second vendor update and the second set of logs to the vendor.

10. The computing device of claim 9, the operations further comprising:

receiving a modified update from the vendor;

uninstalling the second vendor update from the replica container;

installing the modified update in the replica container;

performing the plurality of tests to the replica container with the modified update installed to generate a third set of logs;

performing a third analysis of the third set of logs;

determining, based on the third analysis, that the modified update causes no issues; and sending the modified update to the client device.

11. The computing device of claim 7, wherein the vendor update comprises at least one of:
  an operating system update to an operating system that is installed on the client device;
  a software application update to a software application that is installed on the client device;
  a driver update to a driver that is installed on the client device;
  a basic input output system (BIOS) update to a BIOS of the client device; or
  a firmware update to a firmware of a hardware component of the client device.

12. The computing device of claim 7, the operations further comprising:
  receiving the configuration data from the client device, the configuration data comprising:
    an operating system version that is installed on the client device;
    a software application version that is installed on the client device;
    a driver version that is installed on the client device;
    a basic input output system (BIOS) version of the client device; and
    a firmware version installed in a hardware component included in the client device.

13. One or more non-transitory computer-readable media storing instructions that are executable by one or more processors to perform operations comprising:
  receiving a vendor update from a vendor;
  determining, based on configuration data associated with a client device, that the vendor update is associated with the client device;
  creating a container;
  configuring the container, based on the configuration data associated with the client device, to replicate a configuration of the client device to create a replica container;
  installing the vendor update in the replica container;
  performing a plurality of tests to the replica container with the vendor update installed to generate a set of logs, the plurality of tests including (1) performing a normal boot, (2) performing a fast boot, (3) performing a hibernate followed by a boot from hibernate, (4) performing a set of file handling tests including creating a file, opening the file, writing to the file, reading from the file, and deleting the file, and (5) determining a memory footprint of at least one software application executing on the client device;
  performing an analysis of the set of logs;
  determining, based on the analysis, that the vendor update caused no issues; and
  sending the vendor update to the client device.

14. The one or more non-transitory computer-readable media of claim 13, the operations further comprising:
  determining, by a machine learning algorithm, a test category associated with individual tests of the plurality of tests;
  determining, by the machine learning algorithm and based on multiple sets of logs generated by performing the plurality of tests to multiple vendor updates, a frequency of failure of individual test categories; and
  determining, by the machine learning algorithm and based on the frequency of failure of the individual test categories, an order in which to perform the tests.

15. The one or more non-transitory computer-readable media of claim 13, the operations further comprising:
  receiving a second vendor update from the vendor;
  uninstalling the vendor update from the replica container;
  installing the second vendor update in the replica container;
  performing the plurality of tests to the replica container with the second vendor update installed to generate a second set of logs;
  performing a second analysis of the second set of logs;
  determining, based on the second analysis, that the second vendor update caused at least one issue; and
  sending the second vendor update and the second set of logs to the vendor.

16. The one or more non-transitory computer-readable media of claim 15, the operations further comprising:
  receiving a modified update from the vendor, wherein the modified update comprises at least one of:
    an operating system update to an operating system that is installed on the client device;
    a software application update to a software application that is installed on the client device;
    a driver update to a driver that is installed on the client device;
    a basic input output system (BIOS) update to a BIOS of the client device; or
    a firmware update to a hardware component included in the client device;
  uninstalling the second vendor update from the replica container;
  installing the modified update in the replica container;
  performing the plurality of tests to the replica container with the modified update installed to generate a third set of logs;
  performing a third analysis of the third set of logs;
  determining, based on the third analysis, that the modified update causes no issues; and
  sending the modified update to the client device.

17. The one or more non-transitory computer-readable media of claim 13, the operations further comprising:
  receiving the configuration data from the client device, the configuration data comprising:
    an operating system version that is installed on the client device;
    a software application version that is installed on the client device;
    a driver version that is installed on the client device;
    a basic input output system (BIOS) version of the client device; and
    a firmware version installed in a hardware component included in the client device.

* * * * *